United States Patent

Werkmann et al.

Patent Number: 5,527,163
Date of Patent: Jun. 18, 1996

[54] MOUNTING OF SUCKING JET PUMP IN PLURAL CHAMBER FUEL TANK

[75] Inventors: Karl-Heinz Werkmann, Maintal; Frank Reiter, Bad Soden; Burkhard Dasbach, Eppstein; Manfred Bigalke, Vaterstetten, all of Germany

[73] Assignees: VDO Adolf Schindling AG; Bayerische Motoren Werke Aktiengesellschaft

[21] Appl. No.: 353,515

[22] Filed: Dec. 9, 1994

[30] Foreign Application Priority Data

Dec. 17, 1993 [DE] Germany ............... 43 43 199.2

[51] Int. Cl.⁶ ............................................. F04F 5/44
[52] U.S. Cl. ............................ 417/181; 417/151; 123/514
[58] Field of Search ........................... 417/151, 181, 417/198; 137/568; 123/509, 510, 514; 285/174

[56] References Cited

U.S. PATENT DOCUMENTS

| | | | |
|---|---|---|---|
| 2,112,290 | 10/1936 | Holland | 417/181 |
| 3,729,273 | 4/1973 | Shimrony | 417/151 |
| 4,340,023 | 7/1982 | Creager | 123/514 |
| 4,716,931 | 1/1988 | Shibamoto . | |
| 4,763,633 | 8/1988 | Nakanishi | 123/509 |
| 4,860,714 | 8/1989 | Bucci | 123/514 |
| 5,040,516 | 8/1991 | Haraguchi | 123/514 |
| 5,056,492 | 10/1991 | Banse | 123/514 |
| 5,133,324 | 7/1992 | Michiaki | 123/514 |
| 5,186,152 | 12/1993 | Cortochiato et al. | 123/514 |
| 5,237,977 | 8/1993 | Tuckey | 123/514 |

FOREIGN PATENT DOCUMENTS

| | | | |
|---|---|---|---|
| 0191362 | 8/1986 | European Pat. Off. . | |
| 4123367 | 1/1993 | Germany . | |
| 15756 | 1/1983 | Japan | 123/509 |
| 1453899 | 10/1976 | United Kingdom | 285/174 |
| 2077863 | 12/1981 | United Kingdom | 123/509 |
| 2236990 | 4/1991 | United Kingdom . | |

Primary Examiner—Richard A. Bertsch
Assistant Examiner—Ted Kim
Attorney, Agent, or Firm—Martin A. Farber

[57] ABSTRACT

A holding flange (5) is detachably connected on its bottom to a coupling part (7) within a fuel chamber (2). A flexible hose (8) leading to a sucking-jet pump (9) and a spring action arm (10) for holding the sucking-jet pump (9) down on the bottom of the fuel chamber (2) are fastened to said coupling part (7). For mounting and removal, the coupling part (7) can be separated from the holding flange (5) together with the structural parts fastened to it.

3 Claims, 2 Drawing Sheets

MOUNTING OF SUCKING JET PUMP IN PLURAL CHAMBER FUEL TANK

FIELD AND BACKGROUND OF THE INVENTION

The present invention relates to a sucking-jet-pump unit which has a sucking-jet pump connected by a flexible hose to a holding flange which can be inserted into an opening in a fuel tank, the sucking-jet pump being held away from the holding flange by a holding-down device which is also fastened to the holding flange.

Sucking-jet-pump units of the above type are installed today in the fuel tanks of modern motor vehicles and are therefore known. They serve to convey fuel from one fuel chamber of the fuel tank into the other fuel chamber. The fuel which flows back from the injection system of the engine of the motor vehicle is generally used as drive means for such sucking-jet-pump units. The sucking-jet pump which is arranged in a fuel chamber is ordinarily firmly attached to the holding flange by means of its flexible hose. The holding-down device also forms a structural unit with the holding flange.

The known sucking-jet-pump units have the disadvantage that, with the holding-down device, their flexible hose and the holding flange, they form a rather bulky unit, which constitutes a disadvantage upon the mounting.

SUMMARY OF THE INVENTION

It is an object of the invention to develop a sucking-jet pump unit of the aforementioned type in such a manner that the installing and removal of it in a fuel chamber of a fuel tank is as simple as possible.

According to the invention, this problem is solved by a coupling part (7) which is detachably connected to the holding flange (5), the holding-down device (10) and the hose (8) being fastened to said coupling part (7).

This development makes it possible first of all to handle the holding flange and the structural unit comprising the coupling part, the holding-down device and the sucking-jet pump as separate parts upon the mounting. The sucking-jet pump together with the coupling part and the holding-down device can then be partially inserted into the fuel chamber and the connection then made with the holding flange, which is substantially easier to effect than installing a structural part which forms a single unit from the very start.

The coupling part is secured against turning relative to the holding flange in simple fashion, if, in accordance with one advantageous embodiment of the invention, the coupling part (7) has, alongside each other, two insertion parts (14, 15) which can be inserted into corresponding receivers (12, 13) in the holding flange (5), the first insertion part (14) being developed as a length of pipe for connecting the sucking-jet pump (9) to a fuel connection of the holding flange (5), and the second insertion part (15) being developed as an anti-turn device.

It is also advantageous if a non-return valve (16) which opens in the direction of the sucking-jet pump (9) is arranged in the first insertion part (14) or in the receiver (12) for the first insertion part (14). Such a non-return valve can be particularly easily installed due to the separable connection between the coupling part and the holding flange.

The invention permits of numerous embodiments. In order further to explain its basic principle, one such embodiment is shown in the drawings and will be described below. In the drawings:

FIG. 1 is a cross-sectional view through a part of the fuel tank having the sucking-jet-pump unit of the invention; and FIG. 2 is a sectional view through a mount for the sucking-jet-pump unit.

The sucking-jet pump 9, by means of the returning fuel, as driving agent, sucks fuel out of the fuel chamber 2 and conveys it, via pump outlet 9b and a line 11, into the other fuel chamber 3.

Figure 1:
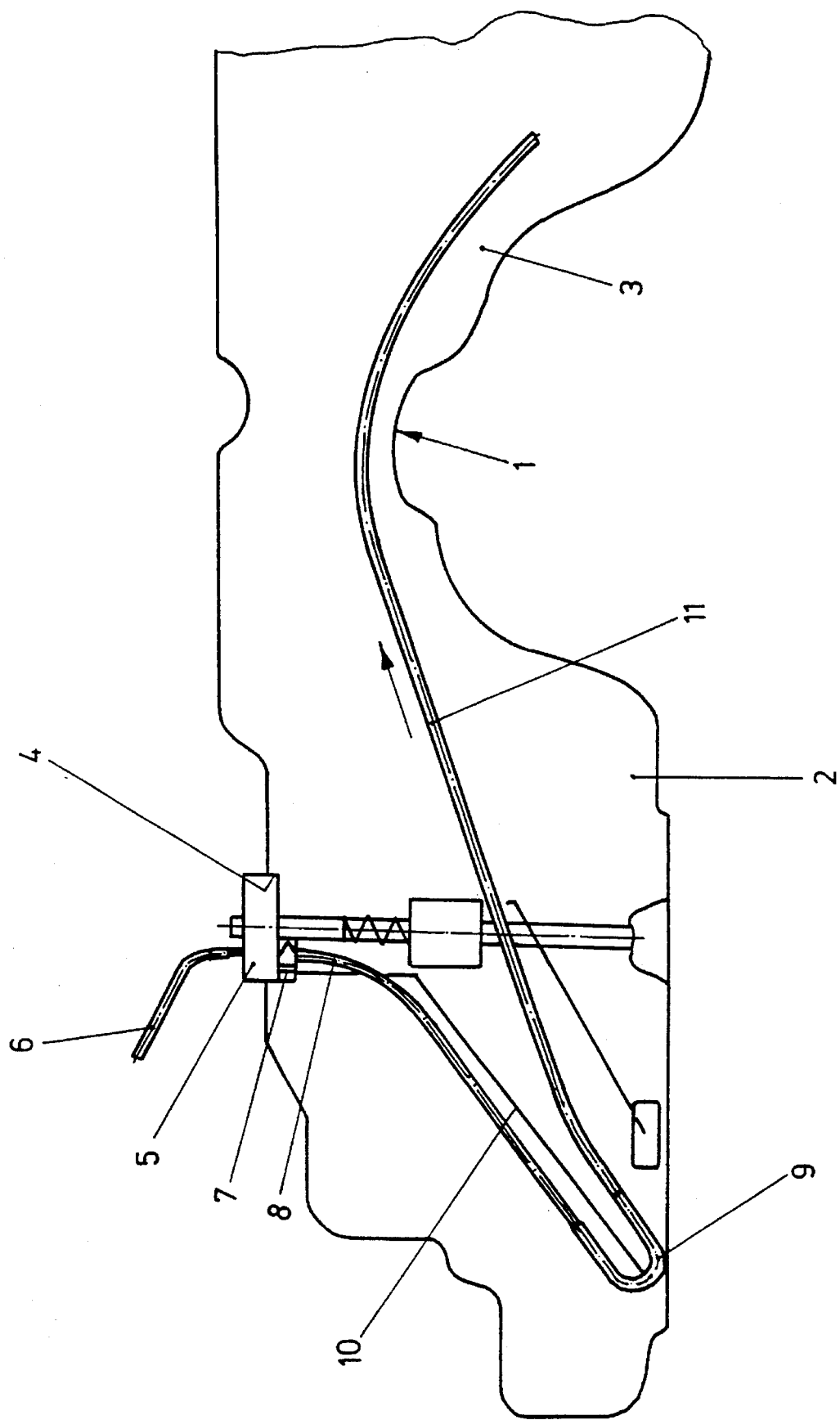
FIG. 1 shows a fuel tank 1 which has two fuel chambers 2, 3. The fuel chamber 2 is provided on its top with an opening 4 into which a holding flange 5 is inserted from above. Into this holding flange 5 there extends a return line 6 which conducts fuel flowing back from an injection system. This fuel flows from the holding flange 5 via a coupling part 7 which is detachably connected to it and a flexible hose 8 via a pump inlet 9a to a sucking-jet pump 9 which lies on the bottom of the fuel chamber 2 and is held in this position by a holding-down device 10 which is fastened on the coupling part 7. This holding-down device 10 can be a holding-down device of spring steel.
Figure 2:
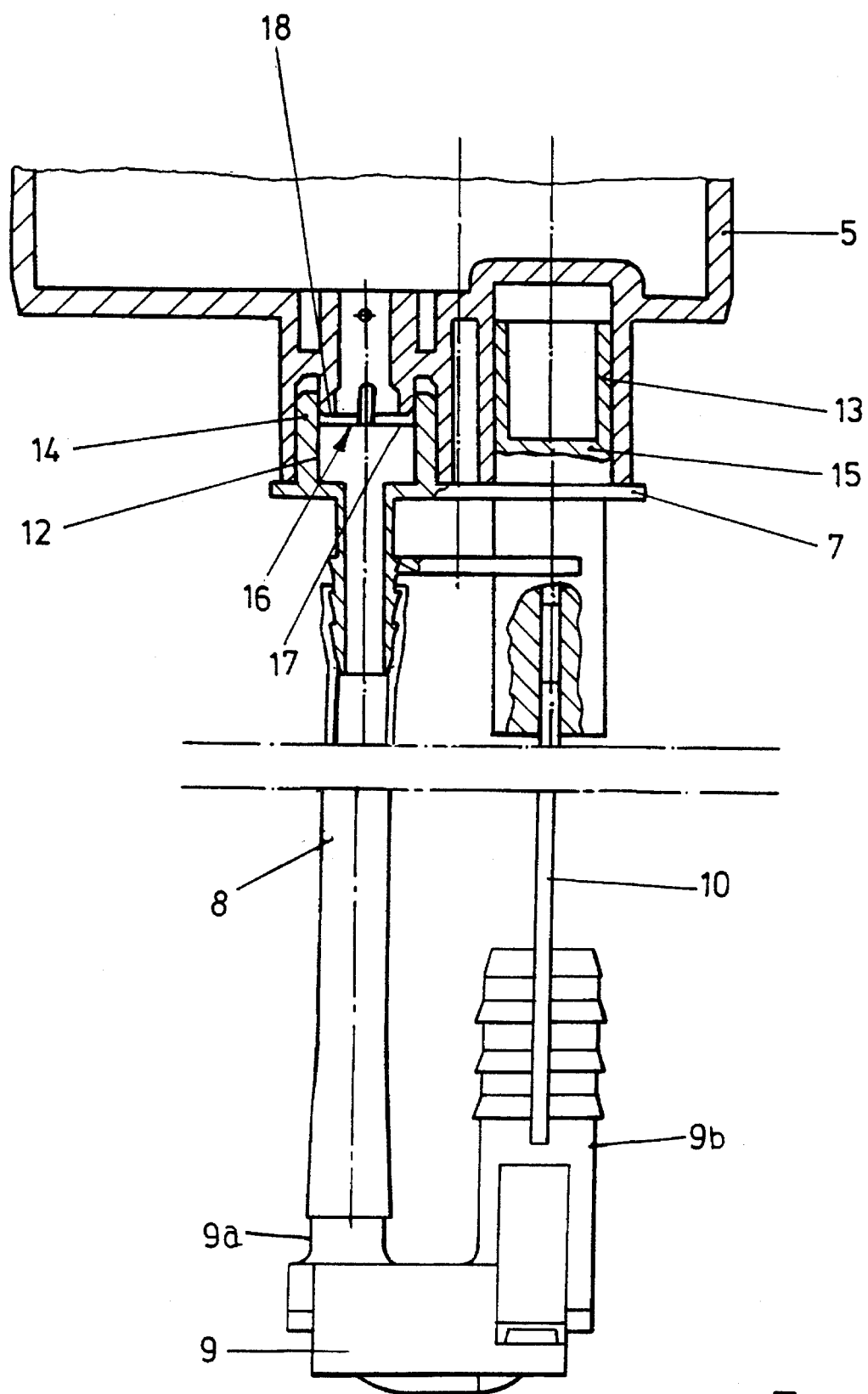

The sectional view of FIG. 2 shows the lower end of the holding flange 5. This flange has, alongside each other, two receivers 12, 13, into which corresponding insertion parts 14, 15 of the coupling part 7 are inserted. Detent means by which the coupling part 7 is detachably held in the inserted position shown are not indicated in the drawing. The insertion part 14 is a length of pipe through which the returning fuel, which serves as driving agent, can pass to the hose 8 and, via it, to the sucking-jet pump 9. The insertion part 15 serves merely as anti-turn device.

FIG. 2 furthermore shows a non-return valve 16 in the receiver 12, it having a valve plate 17 which, as seen in the drawing, rests from the bottom against a valve seat 18. The non-return valve 16 prevents fuel from passing out of the fuel tank 1 when the motor vehicle comes into an extreme inclined position or comes to lie on its roof as the result of an accident.

We claim:

1. A conveyor unit for conveying fuel to a fuel injection system by means of a sucking-jet-pump from a first fuel chamber into a second fuel chamber of a fuel tank, comprising:

a holding flange insertable into an opening at the top of the first fuel chamber, the opening being closed by said holding flange, a flexible hose, a spring action arm fastened to the holding flange, and a sucking-jet pump in fluid communication with the flexible hose;

a return flow line for fuel flowing back from the injection system, wherein the return flow line opens into a fuel connection of said holding flange for connection at said holding flange to said flexible hose;

wherein said sucking jet pump lies on the bottom of the first fuel chamber, there being a line leading from an outlet of said pump into the second fuel chamber;

said spring-action arm extends from said holding flange and urges said sucking jet pump against the bottom of the first fuel chamber; and said conveyor unit further comprises a coupling part by which the return flow line of the holding flange connects to the flexible hose, said arm being fastened to said coupling part, said coupling part being detachably connected to said holding flange.

2. A sucking-jet-pump unit according to claim 1, wherein
the holding flange includes a first receiver and a second receiver, the coupling part comprises a first insertion part and a second insertion part located alongside the first insertion part, and the holding flange has a fuel connection; and said first and said second insertion parts are insertable into respectively said first and said second receivers in the holding flange, said first insertion part comprising a length of pipe for connecting the sucking-jet pump to said fuel connection of the holding flange, and said second insertion part comprising an anti-turn device.

3. A sucking-jet-pump unit according to claim 2, further comprising a non-return valve which opens in the direction of fluid flow in the sucking-jet pump, said non-return valve being disposed in said first insertion part or in said first receiver.

\* \* \* \* \*